United States Patent [19]
Asbridge

[11] Patent Number: 5,309,726
[45] Date of Patent: May 10, 1994

[54] AIR HANDLER WITH EVAPORATIVE AIR COOLER

[75] Inventor: Timothy M. Asbridge, Fenton, Mo.

[73] Assignee: Southern Equipment Company, St. Louis, Mo.

[21] Appl. No.: 991,369

[22] Filed: Dec. 15, 1992

[51] Int. Cl.⁵ .............................................. F28C 1/00
[52] U.S. Cl. ........................................ 62/91; 62/171; 62/309; 62/315; 261/26; 261/DIG. 3
[58] Field of Search ................... 62/171, 176.4, 304, 62/309, 315, 316, 91; 236/44 B; 261/26, 27, 100, 101, 115, DIG. 3, DIG. 43, 97, 98

[56] References Cited

U.S. PATENT DOCUMENTS

| | | | |
|---|---|---|---|
| 1,837,798 | 12/1931 | Shipley . | |
| 2,212,356 | 8/1940 | Shure | 62/129 |
| 2,513,010 | 6/1950 | Deverall | 257/55 |
| 2,566,319 | 9/1951 | Deacon | 60/35.6 |
| 2,655,795 | 10/1953 | Dyer | 62/4 |
| 2,939,687 | 6/1960 | Goettl | 261/26 |
| 3,182,718 | 5/1965 | Goettl | 165/60 |
| 3,218,952 | 11/1965 | Gygax | 98/36 |
| 3,324,782 | 6/1967 | Norris et al. | 98/33 |
| 3,572,234 | 3/1971 | Schoenthaler | 98/36 |
| 3,800,553 | 4/1974 | Engalitcheff, Jr. | 72/310 |
| 4,028,440 | 6/1977 | Engalitcheff, Jr. | 261/23 R |
| 4,028,906 | 6/1977 | Gingold et al. | 62/183 |
| 4,031,710 | 6/1977 | Rideout | 62/171 |
| 4,204,409 | 5/1980 | Satama | 62/271 |
| 4,266,406 | 5/1981 | Ellis | 62/183 |
| 4,281,522 | 8/1981 | Bussjager | 62/409 |
| 4,332,137 | 6/1982 | Hayes, Jr. | 62/81 |
| 4,381,817 | 5/1983 | Brigida et al. | 165/110 |
| 4,519,217 | 5/1985 | Phillips et al. | 62/256 |
| 4,576,012 | 3/1986 | Luzenberg | 62/157 |
| 4,612,778 | 9/1986 | Medrano | 62/311 |
| 4,726,197 | 2/1988 | Megrditchian | 62/309 |
| 4,730,462 | 3/1988 | Rogers | 62/171 |
| 4,917,174 | 4/1990 | Ring | 165/26 |
| 4,926,656 | 5/1990 | Hickley et al. | 62/310 |
| 4,939,907 | 7/1990 | Taylor | 62/95 |
| 4,968,457 | 11/1990 | Welch | 62/171 |
| 5,003,789 | 4/1991 | Gaona et al. | 62/304 |
| 5,003,961 | 5/1991 | Besik | 126/110 |
| 5,056,588 | 10/1991 | Carr | 165/10 |

FOREIGN PATENT DOCUMENTS

| | | | |
|---|---|---|---|
| 225243 | 7/1985 | German Democratic Rep. | 62/171 |
| 55-72689 | 5/1980 | Japan . | |

*Primary Examiner*—Harry B. Tanner
*Attorney, Agent, or Firm*—Richard G. Heywood

[57] ABSTRACT

An air handler for conditioning recirculated or make-up space air and including a conditioning chamber and air flow means for moving air therethrough. An evaporative air cooler of the air handler has an air permeable pad extending across the chamber and a fluid spray system for maintaining a moist condition of the pad. The spray system is constructed and arranged to discharge cooling fluid spray patterns covering the upstream side of the pad in a plurality of predefined zones, and further includes a plurality of moisture sensors positioned at predetermined locations adjacent to the downstream side of the pad. A controller is responsive to sensed moisture conditions for controlling the activation and deactivation of the spraying mechanism to maintain at least a preselected moisture content in the pad.

15 Claims, 4 Drawing Sheets

AIR HANDLER WITH EVAPORATIVE AIR COOLER

BACKGROUND OF INVENTION

1. Field of the Invention

The present invention relates to the evaporative air cooler art.

2. Description of the Prior Art

Air handlers having evaporative coolers, of the type to which the present invention particularly relates, include a housing defining a conditioning chamber in which the air is cooled and/or humidified as a fan moves or recirculates space air through the chamber. The housing may also define other chambers or zones in which some other conditioning (e.g., heating, pre-filtering, dehumidifying) may occur. The evaporative cooler includes an air permeable, fluid retaining pad which is disposed transversely to the direction of air flow through the conditioning chamber, and a water delivery system is provided for keeping the pad moist. In the field of evaporative air cooling, it is well known that sensible heat from warm, unsaturated air passing through a wetted evaporative pad is, in part, transferred to the water in the pad. Ideally, the sensible heat of the air is converted into latent heat through evaporation of the water throughout the pad and the water vapor mixed into the air stream. In this way, the air moved through the air handler is cooled. In order for evaporative cooling to continue, water removed from the pad by evaporation or otherwise must be replaced.

Present systems for delivering water to the pad fail to maintain an adequate and relatively uniform moisture level in the pad. The development of major dry areas on the pad reduces efficiency because warm, unconditioned air will by-pass normal evaporative heat exchange through the moisture barrier areas on the pad and become mixed with the conditioned air on the downstream side of the pad thereby decreasing the cooling potential and efficiency. In some instances, pads have become completely dry before resoaking, causing scaling of the pad and the development of deposits on the pad. Scaling and deposit formation on the pad reduce its air permeability and the useful life of the pad. Attempts to avoid scaling and deposits by constantly bleeding water onto the pad and flushing the pad have been of limited success and cause water to be wasted. Moreover, existing evaporative coolers are not responsive to changes in the state of the incoming air. Changes in temperature and water content of incoming air will cause water to be evaporated more or less rapidly from the pad. Therefore, depending upon the state of the incoming air, the amount or frequency of soaking of the pad may be far more than needed, causing water to be wasted, or may not be enough to prevent dry spots from developing on the pad.

Occasionally, unpleasant odors may be introduced into the conditioned air when an air handler has begun moving air through the pad before soaking of the pad. The introduction of odors typically occurs when the air handler is first activated. The problem of odor is exacerbated by the use of recirculated water to the pad, as is common in existing air handlers. Recirculated water is more likely to have debris in it which can clog the nozzles or other orifices through which water is delivered to the pad, causing uneven soaking of the pad. Moreover, recirculated water tends to pick up heat as it is being circulated, causing less heat to be transferred from the air in the pad. However, recirculating water delivery systems are presently used in order to conserve water.

The water retaining pad of a prior art evaporative cooler is positioned with its upstream side lying in a plane transverse or perpendicular to the direction of air flow through the air cooling chamber. Air moves through the pad relatively quickly, thereby limiting the amount of heat transfer which occurs. Moreover, the rapid air flow through the pad tends to push some of the unevaporated water out the downstream side of the pad, causing the pad to lose water without the cooling benefits associated with water loss by evaporation. The problem of unevaporated water being carried through the pad is made worse by the presence of too much water in the pad. Frames supporting the pads usually have louvers which reduce the pad surface area facing the air flow, and cause increased air velocities through the pad.

SUMMARY OF THE INVENTION

It is a feature of the present invention to provide an air handler having an evaporative cooler for conditioning recirculated or make-up space air by passing air through a pad having a moisture control level, which efficiently cools the air.

It is a further feature of this invention to prevent dry spots from developing on the pad.

It is still a further feature of this invention to inhibit scaling and the occurrence of deposits on the pad.

Another feature of the present invention is to provide such an evaporative cooler which conserves water.

A further feature of this invention is to provide an air handler which supplies moisture to the pad in response to pad conditions.

It is still further a feature of this invention to provide an air handler which can adjust the amount of water supplied to the pad as conditions of the air entering the air handler change.

Still another feature of this invention to obviate the introduction of unpleasant odors into the recirculated or make-up air.

Yet another feature of this invention is to increase the turbulence in the air flow at the pad to increase the heat transferred.

A further feature of this invention is to increase the distance of the airflow paths through the pad without increasing pad thickness.

It is further a feature of this invention to prevent unevaporated water in the pad from being pushed through and out the downstream side of the pad.

According to the above features, from a broad aspect, the present invention provides an air handler for conditioning recirculated or make-up space air including a conditioning chamber and air flow means for moving air therethrough. An evaporative air cooler, forming a part of the air handler, has an air permeable pad extending across the chamber and spray means for maintaining a predetermined moisture condition of the pad. The spray means are constructed and arranged to discharge cooling fluid spray patterns covering the upstream side of the pad in a plurality of predefined zones. A plurality of moisture sensors positioned at predetermined locations adjacent to the downstream side of the pad detect the moisture condition of the pad. Control means responsive to sensed moisture conditions controls activation and deactivation of the spray means whereby to maintain at least a preselected moisture content in the pad.

A method of evaporative cooling in an air handler is also disclosed.

BRIEF DESCRIPTION OF THE DRAWINGS

These and other objects of the present invention will become apparent from the following description of a preferred embodiment as illustrated by the accompanying drawings, in which.

DESCRIPTION OF THE PREFERRED EMBODIMENT

Figure 1:
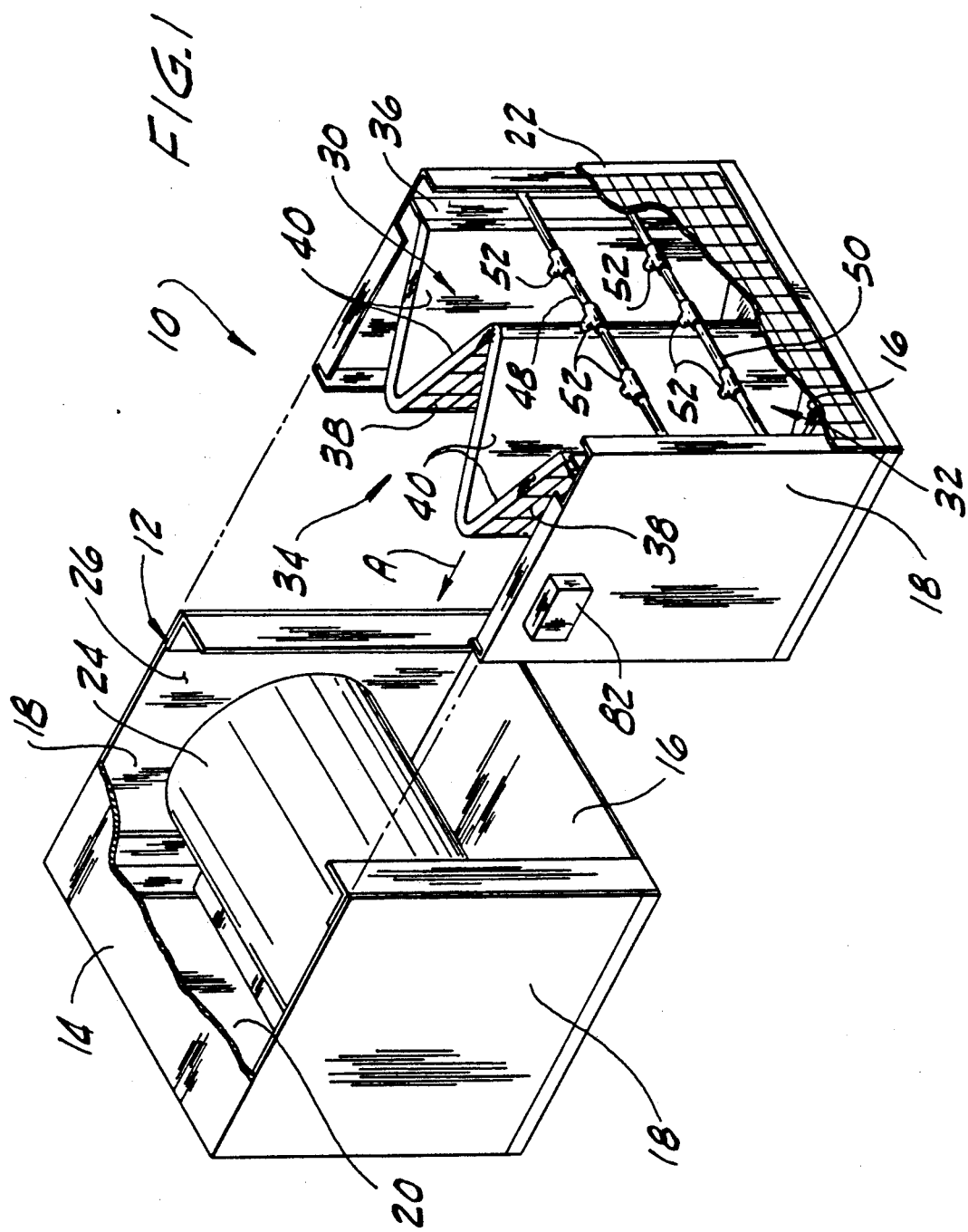
FIG. 1 is a partially exploded perspective view of an air handler having an evaporative cooler, with parts removed and parts broken away to show detail.
Figure 2:
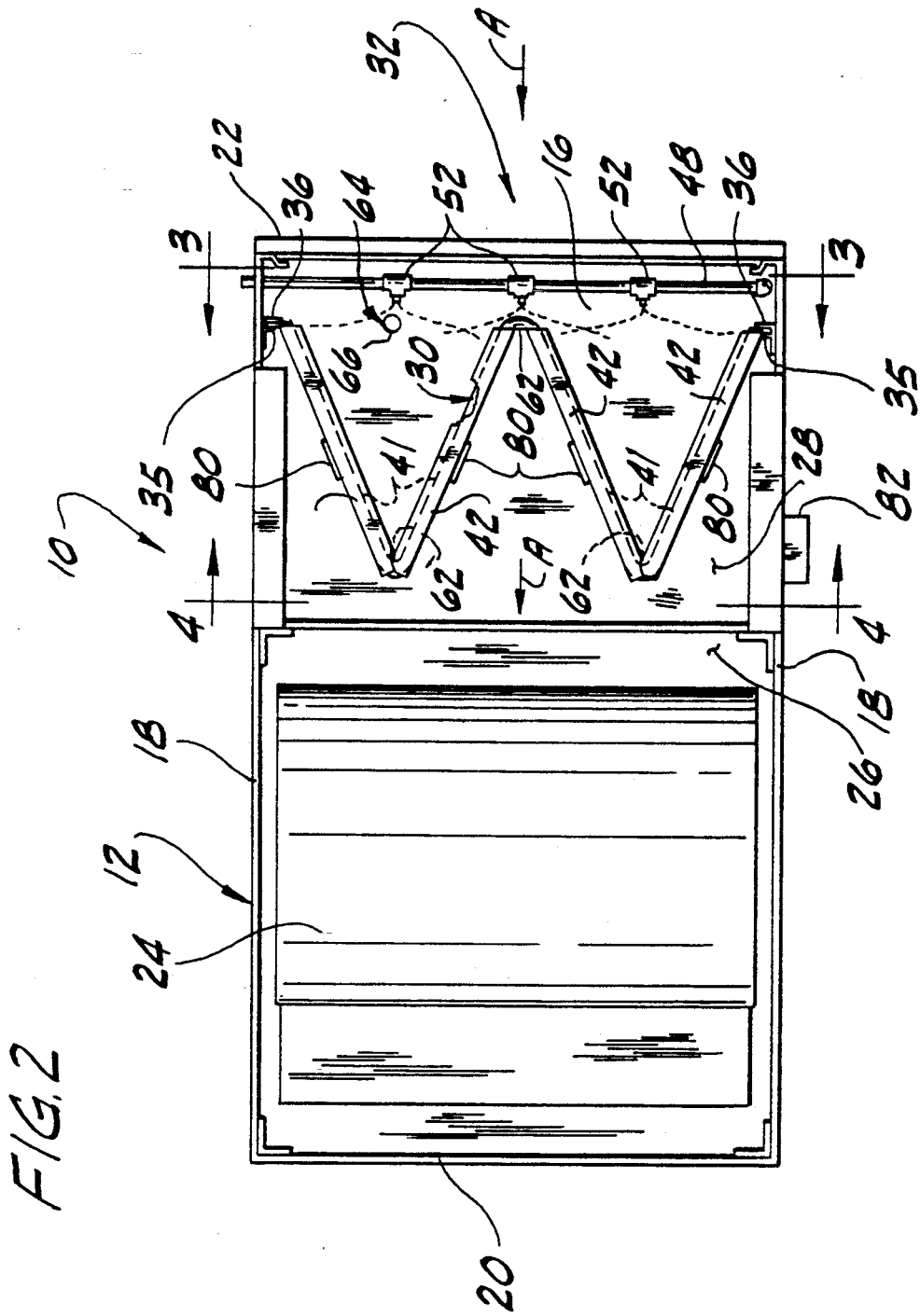
FIG. 2 is a top plan view of the air handler with its top wall removed to show the interior.

Referring now to FIG. 1, an air handler 10 is shown for conditioning recirculated or make-up space air in a building (not shown) such as a restaurant, industrial facility, indoor sports arena or the like in which such circulated or replacement air is required. The air handler 10 includes a housing, generally indicated at 12, having a top wall 14, a bottom wall 16, a pair of spaced apart side walls 18 and a back wall 20. The front of the housing 12 is covered by a slotted or louvered inlet panel 22 which permits the flow of outside air into the housing. However, the inlet may be connected into an air return duct system and/or a fresh make-up air source. A filter (not shown) may also be disposed over the inlet. A blower 24 located in a blower chamber 26 at the rear of the housing 20 is operable to move air through the air handler from the inlet or intake panel 22 and to discharge conditioned air through an opening (not shown) in the bottom wall 16 or a side wall 18 of the housing to an air distribution duct system (not shown) or the like. The direction of air flow through the housing is indicated by arrows A in FIGS. 1 and 2. The blower 24 is of a type which is conventional in air handlers of the type to which this invention particularly relates.

The housing 12 further defines a conditioning chamber, shown generally at 28, upstream of the blower 24 in which an evaporative air cooler, indicated generally at 32, of the present invention is disposed. The air cooler 32 includes an air permeable pad 30 that extends across the conditioning chamber 28 between the side walls 18 in an accordian-shaped configuration and blocks the flow of air through the chamber except through the pad. The pad 30 is made of a high efficiency bonded fiber material such as the Dura Pad evaporative cooling media manufactured by Hobbs Bonded Fibers of Groesbeck, Tex., and is highly water absorbent for retaining moisture applied to the pad panels. The pad 30 also functions as a filter to remove impurities from the air as it passes through the pad. As shown best in FIGS. 1 and 2, the accordian-shaped configuration of the pad 30 in the preferred embodiment is defined by four panels 40 folded and angularly oriented in the chamber 28 to form a pair of air-receiving pockets having V-shaped side walls 41 with throats oriented to open in an upstream direction of air flow through the air handler 10. Thus, the pad side walls 41 are obliquely positioned relative to the direction of entering air flow. A support frame, designated generally by reference number 34, supports the pad 30 and each of its panels 40 in the chamber 28. The frame 34 has rigidly vertical edge members 35 mounted by brackets 36 onto the respective side walls 18 of the housing. As shown best in FIG. 4, the frame 34 has three intermediate vertical support members 37 laterally spaced between the edge members 35 and brackets 36. Spans of wire mesh extend between the respective adjacent vertical edge and support members 35, 37 to define four mesh panels 38 that orient the pad panels 40 obliquely to the direction of entering air flow through the conditioning chamber. Flanges 42 at the top and bottom of each mesh panel 38 are connected between adjacent support members 38 and the respective edge members 35.

The evaporative cooler 32 further includes a non-recirculating delivery system 44 (broadly "spray means") for supplying a cooling fluid, such as water, to the pad 30. The delivery system 44 comprises a conduit 46 connected to a water source remote from the air handler 10 and extending into the housing 12. Inside the conditioning chamber 28, the conduit 46 is formed into or connects first with an upper reach or pass 48 and then connects with a lower reach or pass 50. The upper and lower reaches 48, 50 each have three wide angle nozzles 52 arranged in a row for discharging a spray of water onto the upstream surfaces of the pad 30.

Figure 3:
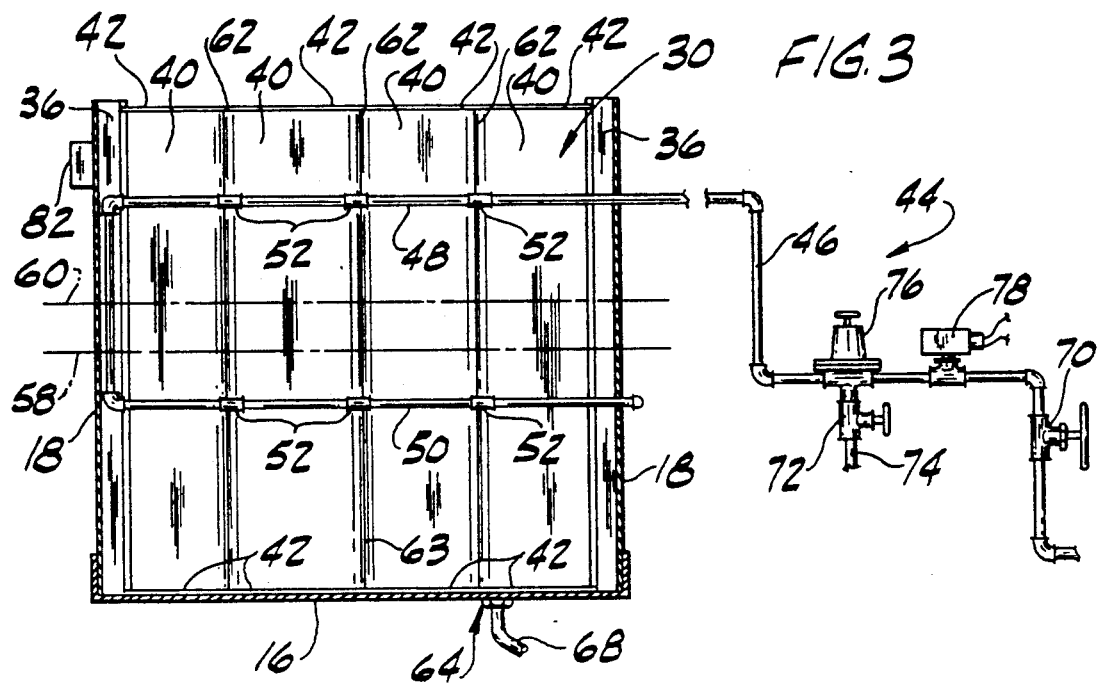
FIG. 3 is a sectional view taken substantially along line 3—3 of FIG. 2, and schematically illustrating a water delivery system.

As shown in FIG. 3, corresponding nozzles 52 in the upper and lower reaches are vertically aligned, and all of the nozzles are aligned with one of three bends 62 in the pad. The center nozzles 52 in the upper and lower reaches 48, 50 are located opposite to the center bend 62 forming the air-splitting leading edge 63 of the pad 30. Water demands at the leading edge 63 tend to be greater because water tends to be pushed off or away from the leading edge and into the air pockets defined by side walls 41. The pad 30 includes an upper zone and a lower zone on opposite sides of a centerline 58 extending side-to-side of the housing 12. The nozzles 52 in the upper reach 48 are located opposite the upper zone and the nozzles in the lower reach 50 are located opposite the lower zone. However, a transverse line 60 bisecting the distance between the upper reach 48 and the lower reach 50 is located above the centerline 58 of the pad. More water is applied to the upper zone of the pad 30 to keep it sufficiently soaked because water in the pad tends to flow downwardly under the effect of gravity to the lower zone.

Each nozzle 52 in the upper reach 48 sprays water in a pattern which covers substantially all of the upper zones of adjacent pad panels, and also the upper portions of the lower zones of the adjacent pad panels. The nozzles 52 in the lower reach 50 each spray water in patterns covering most of the lower zones of adjacent pad panels 40, and also the lower portions of the upper zones of adjacent pad panels. In the illustrated embodiment, the lower zone spray patterns do not extend to the bottom of the pad panels 40. Gravity flow of the water in the pad 30 is sufficient to maintain sufficient moisture levels in portions of the pad below the lower zones which are not covered by the spray patterns of the nozzles 52 in the lower reach 50. The spray patterns of the nozzles 52 are selected so that thorough coverage of the upper zone is achieved. The preferred arrangement of the nozzles 52 in relation to the pad 30 described herein is believed to provide the most efficient and effective soaking of the pad. However, it is to be understood that plural nozzles 52 may be arranged other than described and still fall within the scope of the present invention.

The bottom wall 16 of the chamber 28 is constructed and arranged to accommodate drainage of any overflow water resulting from the cooler operation inasmuch as a feature is to provide a non-recirculating system so that only flesh water will be used. The use of fresh rather than recirculated water helps to prevent scaling and deposit formation on the pad because gradually increasing concentrations of minerals and other impurities does not occur. The problem of the pad 30 introducing odors into the air is also substantially abated by the exclusive use of fresh water to soak the pad. A drain 64 includes a drain opening 66 in the bottom wall 16 of the air handler housing 12, and drain pipe 68 is attached to the housing to carry off excess water from the unit.

The water delivery system includes water controls that are remote from or outside of the air handler 10 and located for ready access by facility maintenance personnel. Such control means include a shut-off service valve 70 in the water delivery conduit 46, which may be closed for service work or seasonally when the evaporative cooler 32 is not being used, as during winter. A drain valve 72 connected to a drainage pipe 74 located downstream from the shut-off valve 70 allows the water in the portion of the conduit 46 in the air handler housing 12 to be drained off. During normal operation when the evaporative cooler 32 is in use, a pressure regulator 76 controls the rate at which water is applied to the pad 30 by the nozzles 52 and the size of the spray patterns of the nozzles. A solenoid valve 78 in the conduit 46 between the shut-off valve 70 and the pressure regulator 76 constitutes the primary control and is operable (as described more fully below) to activate and deactivate the spray cycles of the nozzles 52.

Figure 4:
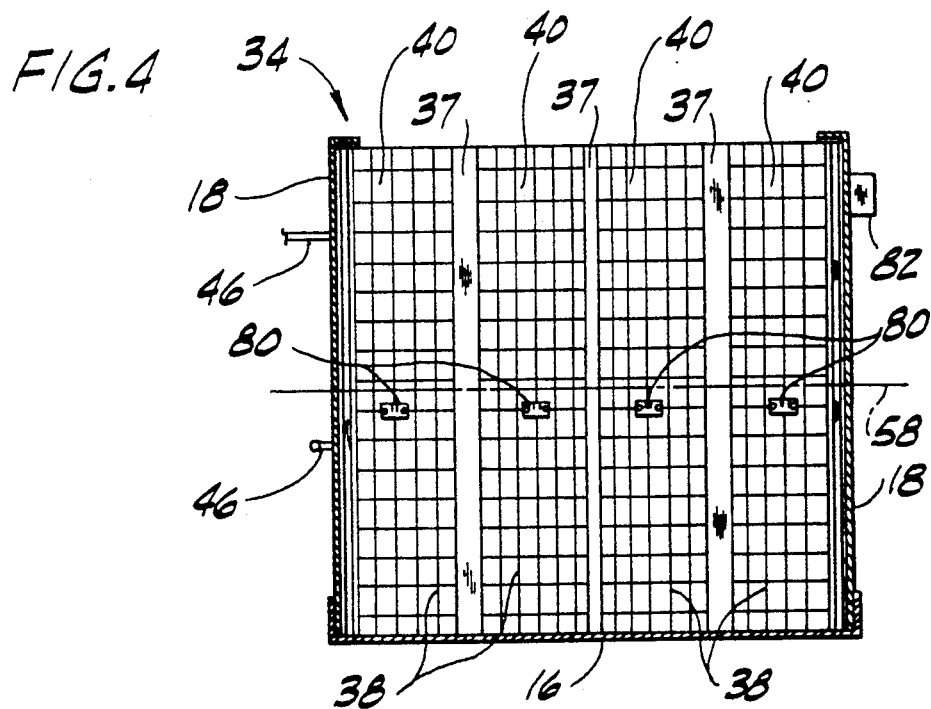
FIG. 4 is another sectional view taken, substantially along line 4—4 of FIG. 2.
Figure 5:
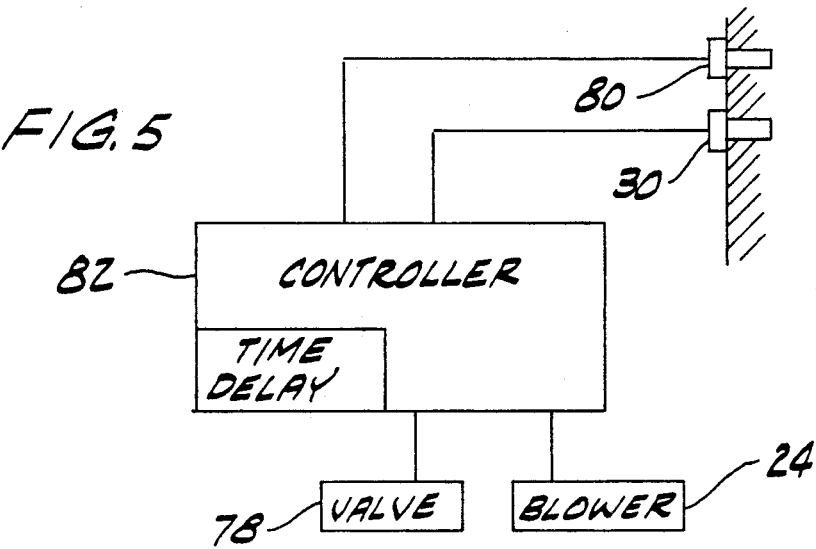
FIG. 5 is a diagrammatic view of the control circuit for the system.
Figure 6:
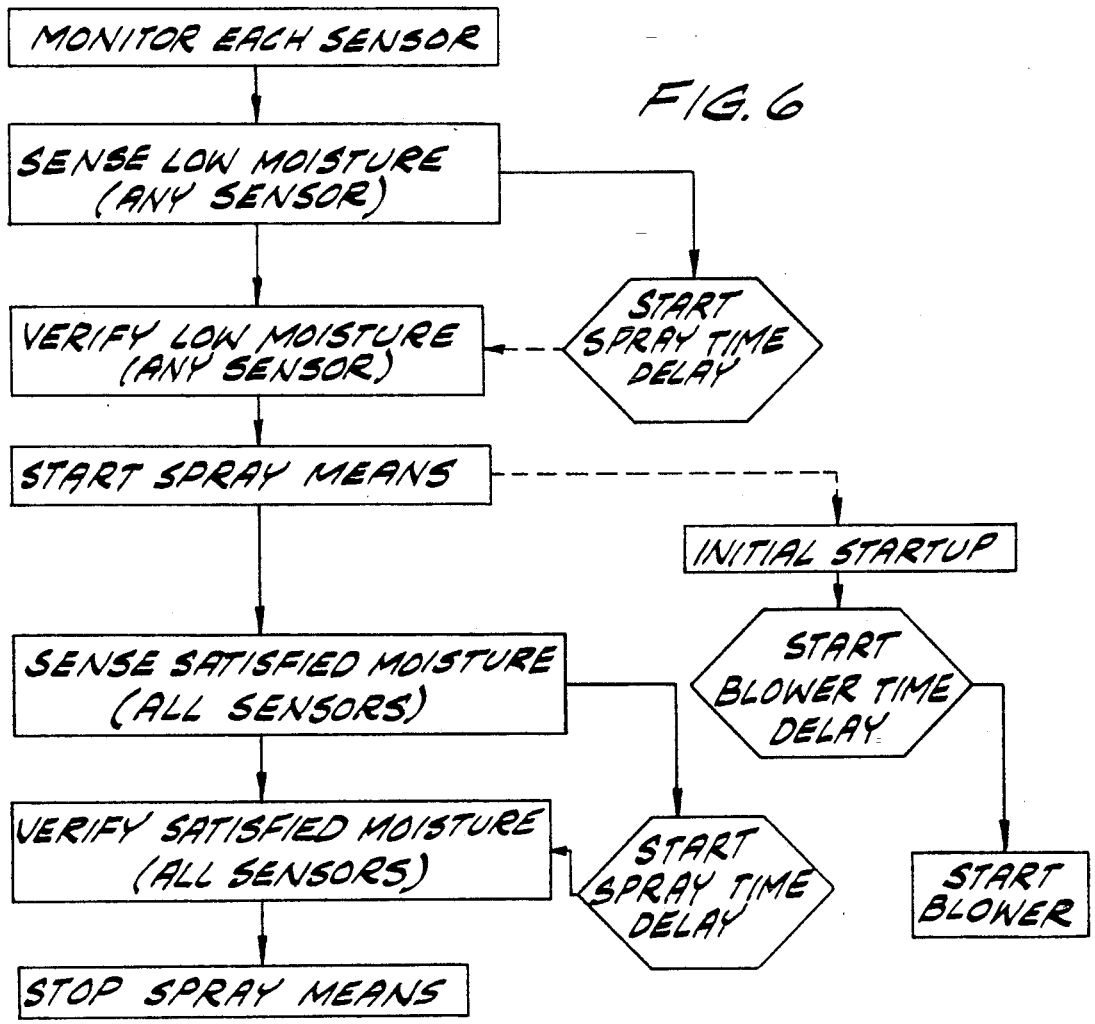
FIG. 6 is a flow chart of the system operations.

Referring now to FIG. 4, a moisture sensor 80 is mounted on each mesh panel 38 of the frame 34 (i.e., on the downstream side of the pad 30) for detecting the amount of moisture in each pad panel 40 at the downstream face of the panel. It is to be understood that the sensors 80 may be arranged for detecting the level of moisture in the pad 30 at other locations and still fall within the scope of the present invention. In the illustrated embodiment, the sensors 80 are the Model SE91347 moisture sensors manufactured by Elec Tron, Inc. of Wichita, Kans. The sensors 80 are electrically connected to a controller (diagrammatically shown in FIG. 1 at 82) responsive to sensed moisture conditions for controlling the activation and deactivation of the solenoid valve 78 for spraying the pad 30. The controller 82 may be the solid state LLC3 Series Liquid Level Control manufactured by SSAC, Inc. of Baldwinsville, N.Y. When all four sensors 80 detect a predetermined level of moisture in the pad, the solenoid valve 78 is closed by the controller. The moisture sensors 80 are arranged generally along a transverse line located slightly below the centerline 58 of the pad 30. The sensors 80 have been placed slightly below the centerline 58 of the pad so that particularly the upper zone of the pad 40 is thoroughly soaked before terminating each spraying cycle.

The controller 82 and moisture sensors 80 are operable to maintain a substantially constant moisture level within preselected parameters throughout the pad 30. Detection by any one of the sensors 80 of a moisture condition in the pad 30 below such predetermined moisture level, signals the controller 82 to open the solenoid valve 78 to initiate a spraying cycle. Neither the pad 30 nor any substantial portion thereof will become completely dried out before application of more water because application of water is driven by sensed moisture conditions on the pad. Thus, scaling and deposit formations on the pad are inhibited and the useful life of the pad 30 is increased. The controller 82 is capable of changing the frequency of water application to the pad 30 to meet changing conditions of the incoming air. For instance, if the incoming air temperature increases substantially, water in the pad 30 will be evaporated in a shorter period of time. The pad 30 will require resoaking sooner than it would when the incoming air temperature was lower. The evaporative cooler 32 of the present invention can accommodate the change in incoming air condition because its spraying cycle is driven by detection by the sensors 80 of dry conditions in the pad 30, not by air temperature and humidity or the passage of a predetermined amount of time.

The orientation of the pad panels 40 against the mesh frame panels 38 at angles oblique to the direction of the flow of air through the conditioning chamber 28 results in improved heat transfer between the air and the cooling medium with reduced nonevaporative water loss or run-off from the pad 30. The accordian configuration of the pad 30 increases the surface through which air may pass. The oblique orientation of the pad 40 lengthens the path the air must travel to pass through the pad 30. Moreover, the angle of intersection of the air with the upstream surfaces of the pad 30 introduces entering air turbulence and slows the air flow, or produces air redirection through the pad panels 40 with increased turbulence and heat exchange. The combination of the increased path length through the pad 30, reduced rate of flow and turbulence gives the air longer residence time in the pad so that more heat is transferred from the air. Water on the upstream side of the pad 30 is not pushed through the pad and out the downstream side of the pad as quickly or easily as would be the case when a pad is oriented with its upstream side perpendicular to the direction of air flow. Instead, water on the upstream side of the pad 30 tends to be pushed along the upstream face of the pad. Therefore, less nonevaporative water loss from the pad 30 occurs and more of the water is evaporated to remove heat from the air.

The operation of the air handler (incorporating the method of evaporative cooling of the present invention) is now described. At the initial start-up of the air handler 10, such as occurs at the beginning of each season of operation, the pad 30 is completely dry. The shut off service valve 70 is open permitting water to flow to the solenoid valve 78. Energization of the sensors 80 and controller 82 causes the dry condition of the pad 30 to be detected, and the solenoid valve 78 is opened allowing water flowing through the conduit 46 to the nozzles 52. The controller 82 may be configured to delay activation of the blower 24 for a predetermined amount of time to allow the pad 30 to become wetted before air is moved through it. The prevention of air from being drawn through a dry pad, and the exclusive use of nonrecirculated water, substantially eliminates the potential for unpleasant odors being introduced into the air.

As stated above, the nozzles 52 are arranged for discharging water in spray patterns onto the upstream side of the pad 30 in a plurality of predefined zones. The nozzle spray patterns overlap substantially to achieve thorough soaking of the pad 30. The rate of water application and the size of the spray patterns can be adjusted using the pressure regulator 76. To best maintain sufficient moisture levels in the pad 30 especially in arid places where the incoming air is hot and dry, the water pressure at the nozzles 52 is set relatively high so that the rate of water delivery will also be relatively high and the spray patterns large so that the pad is heavily soaked before water to the nozzles is shut off by the controller 82. However, where the incoming air usually contains significant, but variable, moisture content, the pressure regulator 76 is adjusted so that the rate at which water is applied to the pad 30 is less to conserve water and limit saturation conditions in the pad 30 to the range of 80-89%. Typically, adjustments of the water pressure are made only at the initial set up of the air handler 10, and are based on the typical weather conditions (e.g., dry or humid) for the geographical region.

The application of water to the pad 30 is controlled by the controller 82 and sensors 80 to maintain a substantially constant moisture content within selected parameters throughout the pad. Water sprayed onto the upstream side of the panels 40 of the pad is absorbed into the pad 30 and carried by the flow of air toward the downstream side of the pad. The sensors 80 are disposed for detecting the moisture content of the pad 30 on the downstream face of each panel 40. In the present embodiment, the sensors 80 are pre-adjusted to detect near saturation conditions on the downstream face of the pad so that the pad will be thoroughly soaked before the spraying cycle is terminated. Detection of all four sensors 80 of moisture levels in their respective panels 40 above a predetermined level causes the controller 82 to shut the solenoid valve 78 to deactivate spraying of the pad 30. In the preferred embodiment, the controller 82 has a 15 second delay between the detection of a saturation moisture level condition by the sensors 80 and the closing of the solenoid valve 78. The controller 82 verifies the reading from the sensors 80 after 15 seconds to make certain the initial reading was accurate.

The location of the sensors 80 on the downstream side of the panels 40 prevents unevaporated water in the pad 30 from being pushed out the downstream side of the pad. Nonevaporative water loss through the downstream side of the pad 30 is commonly referred to as "carry-through" in the art. Such carry-through typically occurs when the pad has been fully soaked (often done in the past to avoid dry spots on the pad), and can cause water in liquid form to be introduced into the airflow which results in, among other things, rusting of the housing 12, blower 24 and ducts (not shown). In addition, water loss by carry-through is wasteful in that there is no beneficial heat transfer from the air to the water lost from the pad as there is with evaporative water loss. Carry-through will occur when there are high levels of moisture at the downstream side of the pad 30. However, in the present invention because the sensors 80 are arranged to detect moisture conditions on the downstream side of the pad 30, water supply to the pad can be stopped before the moisture content on the downstream side reaches levels causing carry-through.

Water is gradually removed from the pad 30 through evaporation into the air. Eventually, one or more of the sensors 80 detects that moisture in the panel 40 has fallen below a predetermined amount. Each sensor 80 is monitored individually for the detection of a dry condition on the pad 30. After the controller 82 receives a signal from one of the sensors 80, it waits 15 seconds to verify the reading from that sensor. Spraying is then activated by signalling the solenoid valve 78 to open. After the initial start-up, the blower 24 runs continuously during normal operation of the cooler and respraying of the pad 30. The cycle of operation of the evaporative cooler 32 is then repeated as moisture is demanded by the sensors 80.

What is claimed is:

1. In an air handler for conditioning recirculated or make-up space air and including a conditioning chamber and air flow means for moving air therethrough, and further comprising an evaporative air cooler having air permeable pad means extending across the chamber on one side of said air flow means and spray means for maintaining a moist condition of such pad means; the improvement which comprises said spray means being constructed and arranged to discharge plural cooling fluid spray patterns covering the upstream side of said pad means in a plurality of predefined zones, and further includes a plurality of moisture sensors positioned at predetermined locations on the downstream side of said pad means, and control means responsive to a sensed low moisture level condition by any one of said moisture sensors for controlling the activation of said spray means whereby to maintain at least a preselected minimum moisture content throughout the zones of said pad means.

2. The air handler of claim 1 in which said control means includes means for verifying the sensed low moisture level condition prior to activating said spray means.

3. The air handler of claim 2 in which said means for verifying comprises time delay means having a preselected time delay for checking the low moisture level condition sensed by a moisture sensor before activating said spray means.

4. An air handler as set forth in claim 1 wherein said control means is operable to deactivate said spray means only when all of said moisture sensors simultaneously detect that a predetermined saturation moisture level condition has been reached in the pad means above the preselected minimum moisture content.

5. The air handler of claim 4 in which said control means includes time delay means for continuing the active spray cycle of said spraying means for a predetermined time after the saturation moisture level condition has been detected.

6. An air handler as set forth in claim 1 wherein the pad means is arranged in an accordian-like configuration, and includes a plurality of panels lying generally in vertical planes oriented obliquely to the primary direction of airflow through the conditioning chamber.

7. An air handler as set forth in claim 6 wherein each pad panel has one of the moisture sensors associated therewith for detecting the moisture level condition thereof.

8. An air handler as set forth in claim 6 wherein said spray means comprises a non-recirculating cooling fluid delivery system including conduit means for delivering cooling fluid from a source of cooling fluid, a plurality of nozzles arranged in the housing for producing the cooling fluid spray patterns covering the predefined zones on the upstream side of the pad, and valve means responsive to the control means for regulating cooling fluid delivery to the nozzles.

9. An air handler as set forth in claim 1 wherein the pad means is folded and arranged in an accordian-like configuration having a plurality of pad panels disposed in vertical planes oriented obliquely to the primary direction of airflow through the conditioning chamber, and wherein each of said nozzles is substantially aligned with a fold in the pad between adjacent panels.

10. An air handler as set forth in claim 9 wherein the nozzles are arranged in an upper row and a lower row, each nozzle in the upper row having a spray pattern generally covering an upper zone of the pad and each nozzle in the lower row having a spray pattern generally covering a lower zone of the pad and said spray patterns being arranged in overlapping relationship.

11. An air handler as set forth in claim 10 wherein the nozzles are arranged for delivering more cooling fluid to the upper zones than to the lower zones of the pad panels.

12. A method of evaporative cooling in an air handler for conditioning recirculated or make-up space air in a conditioning chamber having air flow means controlling air movement therethrough, and further comprising an air permeable pad extending across the chamber on one side of said air flow means and spraying means for maintaining a moist condition of the pad; the method comprising locating said spraying means to discharge cooling fluid spray patterns covering the upstream side of said pad in a plurality of predefined zones, sensing the moisture content of said pad at a plurality of downstream locations therein, and controlling the activation and deactivation of said spraying means in response to sensed moisture conditions at said plural locations to maintain a substantially constant moisture content within preselected parameters throughout the pad.

13. A method as set forth in claim 12 wherein the step of controlling the activation and deactivation of said spraying means still further includes the steps of delaying activation of said spray means for a predetermined amount of time following detection of a low moisture level condition by any one of said plurality of moisture sensors, verifying the existence of said low moisture level condition detected by said one sensor after elapse of said predetermined amount of time, and activating said spray means upon verification of said low moisture condition.

14. A method as set forth in claim 12 wherein the step of controlling the activation and deactivation of said spraying means still further includes the steps of delaying deactivation of said spray means a predetermined amount of time following simultaneous detection of a saturation moisture level condition in the pad by all of said moisture sensors, verifying the existence of said saturation moisture level condition detected by all of said moisture sensors after elapse of said predetermined amount of time, and deactivating said spray means upon verification of said saturation level moisture condition.

15. An evaporative air cooler for conditioning air for use in space cooling, including a conditioning chamber having an accordion-shaped air permeable pad with plural panels obliquely oriented across the chamber, spray means for moistening the pad panels and airflow means for moving air through the chamber and angularly through the pad panels therein;

said evaporative cooler further comprising a plurality of moisture sensors positioned at predetermined locations adjacent to the downstream side of said pad panels, control means responsive to sensed moisture conditions for controlling the activation and deactivation of said spray means, and said spray means being constructed and arranged to discharge cooling fluid spray patterns covering the upstream side of said pad panels in a plurality of predefined zones and maintaining at least a preselected minimum moisture content throughout said zones.

* * * * *